(12) United States Patent
Wigder

(10) Patent No.: US 10,600,071 B2
(45) Date of Patent: Mar. 24, 2020

(54) METHODOLOGY FOR ENSURING VIEWABILITY OF ADVERTISEMENTS IN A FLIP-BASED ENVIRONMENT

(71) Applicant: Flipboard, Inc., Palo Alto, CA (US)

(72) Inventor: David Wigder, Bronx, NY (US)

(73) Assignee: Flipboard, Inc., Redwood City, CA (US)

( * ) Notice: Subject to any disclaimer, the term of this patent is extended or adjusted under 35 U.S.C. 154(b) by 646 days.

(21) Appl. No.: 14/958,742

(22) Filed: Dec. 3, 2015

(65) Prior Publication Data

US 2017/0161782 A1 Jun. 8, 2017

(51) Int. Cl.
*G06Q 30/00* (2012.01)
*G06Q 30/02* (2012.01)

(52) U.S. Cl.
CPC ..... *G06Q 30/0241* (2013.01); *G06Q 30/0272* (2013.01); *G06Q 30/0251* (2013.01)

(58) Field of Classification Search
CPC .......................... G06Q 30/241; G06Q 30/0241
USPC ............................................................ 705/14
See application file for complete search history.

(56) References Cited

U.S. PATENT DOCUMENTS

| 6,496,803 | B1* | 12/2002 | Seet | G06F 3/0483 705/14.73 |
| 7,886,047 | B1* | 2/2011 | Potluri | H04L 67/22 709/224 |
| 2008/0077492 | A1* | 3/2008 | Ho | G06F 17/212 705/14.69 |
| 2010/0211459 | A1 | 8/2010 | Seeman et al. | |
| 2010/0262472 | A1 | 10/2010 | Gautam et al. | |
| 2010/0306039 | A1 | 12/2010 | Green et al. | |
| 2012/0150655 | A1* | 6/2012 | Seth | G06Q 30/02 705/14.66 |
| 2012/0313926 | A1* | 12/2012 | Rolleston | G06T 15/00 345/419 |
| 2013/0268351 | A1* | 10/2013 | Abraham | G06Q 30/0246 705/14.45 |
| 2013/0268847 | A1* | 10/2013 | Kim | G06F 3/0488 715/251 |
| 2014/0085196 | A1* | 3/2014 | Zucker | G06Q 30/0241 345/156 |
| 2014/0195890 | A1* | 7/2014 | Taylor | G06F 17/30 715/234 |

(Continued)

OTHER PUBLICATIONS

PCT International Search Report and Written Opinion for PCT/US16/57302, dated Jan. 9, 2017, 7 Pages.

*Primary Examiner* — Matthew L Hamilton
(74) *Attorney, Agent, or Firm* — Fenwick & West LLP

(57) ABSTRACT

A content delivery system ensures viewability of ads in a flip-based digital magazine. User behavior in the environment of the digital magazine is observed and processed to identify one or more opportunities for ad placement. Ads are selected and placed in the digital magazine in such a way as to satisfy temporal and spatial criteria relating to display of the ads. In one embodiment, a full-page ad is inserted between consecutive content pages of the digital magazine in response to a flip action being performed by the user. The digital magazine may lock the ad in place and allow page transition after minimum display duration is satisfied. In another embodiment, an embedded ad is persisted between consecutive content pages to ensure minimum display duration is satisfied.

4 Claims, 7 Drawing Sheets

(56) References Cited

U.S. PATENT DOCUMENTS

| | | | |
|---|---|---|---|
| 2014/0279028 A1* | 9/2014 | Doser | G06Q 30/0267 |
| | | | 705/14.64 |
| 2014/0304577 A1* | 10/2014 | St. Pierre | G06F 17/21 |
| | | | 715/201 |
| 2015/0058114 A1 | 2/2015 | Yi | |
| 2015/0193817 A1* | 7/2015 | Dharmaji | G06Q 30/0246 |
| | | | 705/14.45 |
| 2015/0242875 A1* | 8/2015 | Stachowski | G06F 17/30893 |
| | | | 705/14.16 |
| 2015/0251477 A1* | 9/2015 | Miller | B42D 1/009 |
| | | | 283/67 |
| 2015/0371258 A1* | 12/2015 | Bramucci | G06Q 30/0246 |
| | | | 705/14.45 |
| 2016/0125453 A1* | 5/2016 | Shukla | G06Q 30/0246 |
| | | | 705/14.45 |
| 2017/0109796 A1* | 4/2017 | Rahle | G06Q 30/0272 |
| 2017/0372376 A1* | 12/2017 | Scharf | G06Q 30/0273 |
| 2017/0372380 A1* | 12/2017 | Candiotti | G06Q 30/0277 |
| 2018/0007340 A1* | 1/2018 | Stachowski | G06F 17/30864 |
| 2018/0032536 A1* | 2/2018 | Stachowski | G06F 17/3087 |
| 2018/0218389 A1* | 8/2018 | Walker | G06Q 30/0277 |

* cited by examiner

METHODOLOGY FOR ENSURING VIEWABILITY OF ADVERTISEMENTS IN A FLIP-BASED ENVIRONMENT

FIELD OF ART

This disclosure relates generally to digital magazines, and in particular to ensuring viewability of content such as advertisements in a flip-based digital magazine environment.

BACKGROUND

A digital magazine application for a computing device (such as a mobile communication device, tablet, computer, or any other suitable computing system) provides a personalized, customizable digital magazine for a user. Based on selections made by the user and/or on behalf of the user, the digital magazine contains and displays a personalized collection of content from a number of sources, thereby providing a useful interface by which the user can consume content that interests and inspires the user.

In addition to digital content, a digital magazine application may also provide advertisements. Advertisements may take the form of text, images, video, audio, gifs or a combination thereof. Advertisements may be static or dynamic, and can include one or more dimensions or virtual reality elements. The display of these advertisements to users, and their interaction with them, produces revenue for the owner or publisher of the digital magazine. For example, in impression-based pricing, where the advertiser pays the publisher for showing an advertisement to a viewer, the publisher is paid by the advertiser only if an impression is counted. For an impression to be counted in online advertising, advertisements often must satisfy a number of criteria relating to the duration of display of the advertisement and the portion of the advertisement that is displayed. Effective ad placement thus requires identifying when, where, and how to place advertisements in the digital magazine to ensure that impressions are counted and thereby increase ad revenue.

SUMMARY

Embodiments of the invention include a software method and computer readable storage medium for ensuring (or simply increasing the likelihood of) the viewability of advertisements ("ads") in an online digital magazine. In this context, "viewability" may refer to a duration, amount, and/or any other measure of display of an advertisement, which may be used as criteria to determine whether a creditable impression of the advertisement has occurred. A digital magazine is a collection of content organized into discrete content pages, on which ads are displayed. Users navigate through the pages of the digital magazine by performing a flip action, or "flipping," which usually involves swiping with a finger on a display screen of a client device.

In various embodiments of the invention, a plurality of parameters describing an individual user's behavior in the environment of the digital magazine are observed, recorded, and processed by an ad placement engine to identify one or more impression opportunities to serve an ad to the user. These parameters may include the rate at which the user flips through the magazine, which content categories are viewed by the user, and/or any other information that may be useful in predicting how the user would consume an ad if displayed by the online digital magazine. In one embodiment, parameters describing flip behavior may be recorded in real time and used to influence ad placement dynamically. In another embodiment, the parameters may be stored as part of a user history profile, and used as predictors to influence ad placement.

The system can further make use of the parameters by determining a likelihood that any given opportunity leads to a creditable ad impression. The ad placement engine uses these observed parameters to identify an impression opportunity in which the display of an ad in the digital magazine would be likely to result in satisfaction of a set of criteria associated with the display of the ad. In this context, the set of criteria may be used to determine whether the display of the ad results in a creditable impression of the ad, wherein the advertiser is willing to pay the publisher for the display of the ad to the user. For each opportunity that is determined to be sufficiently likely to result in an ad impression, the ad placement engine then selects an ad to display and how to display it. In one embodiment, a full-page ad is inserted between consecutive content pages in response to a flip action being performed by a user. In typical embodiments, an ad is embedded in a portion of the content page, and based on the user's flip rate is either persisted or updated as the user flips from one content page to the next.

DETAILED DESCRIPTION

Environment of a Digital Magazine

In typical embodiments, a digital magazine is composed of a cloud-based server that stores content and advertisements and one or more client applications that access and present the content and advertisements for consumption by a user. In the specific context of ads, an online digital content server comprises one or more modules configured to store, retrieve, and distribute advertisements to each instance of a client application in which the digital magazine is being accessed.

Figure 1:
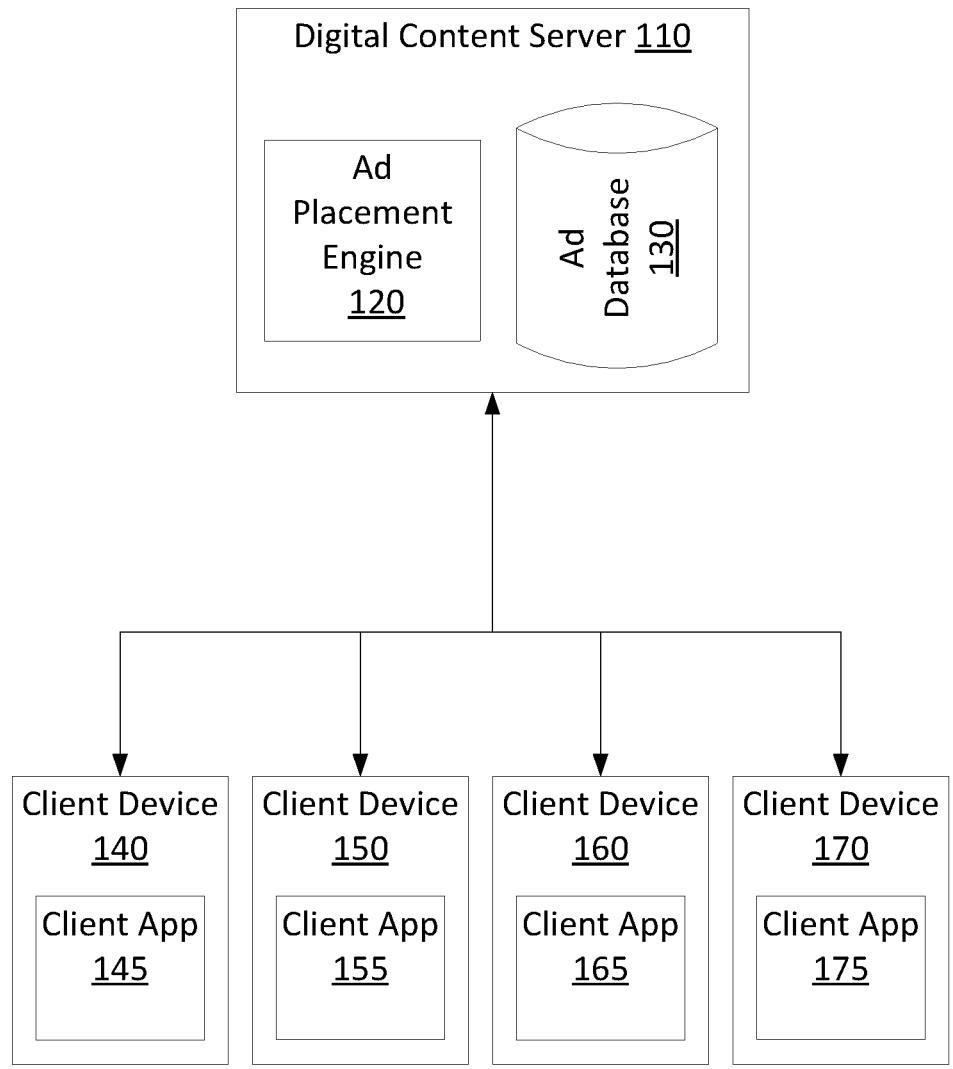
FIG. 1 illustrates a relationship between a digital content system and multiple client devices, according to one embodiment.

FIG. 1 illustrates the relationship between a digital content server and multiple client devices each running a client application, according to one embodiment. The environment 100 comprises a digital content server 110, the digital content server 110 comprising an ad placement engine 120 and an ad database 130, and four client devices 140, 150, 160, and 170, each comprising a single client application 145, 155, 165, and 175 respectively. The ad placement engine 120 within the digital content system 110 retrieves ads from the ad database 130, and transmits the ads to each client device 140, 150, 160, and 170 for display on the client applications 145, 155, 165, and 175 respectively.

Identifying Advertising Opportunities in a Flip-Based Digital Magazine

In some embodiments, advertisements displayed in a flip-based digital magazine environment are required to satisfy one or more temporal and spatial requirements to be counted as a creditable impression and thus produce revenue for an owner or publisher of the digital content system. Various requirements may be imposed for determining whether an ad impression is credited when an advertisement is displayed by the digital magazine. In one embodiment, the advertisement must for at least one second cover at least half of the screen area occupied by the digital magazine displayed within the client application executing on the client device. In another embodiment, at least half of the advertisement must be visible. These and other requirements may be imposed alone or in combination. Further, size and duration requirements associated with creditable ad impressions may vary depending on the type of advertisement (e.g., image, audio, text) being displayed or the platform (such as mobile, non-mobile) on which it is displayed. For example, in one embodiment, ads displayed on non-mobile platforms must be at least 30% visible in order for an ad impression to be credited. In still another embodiment, video ads may be required to be visible (or "in-view") for a minimum of two seconds in order for an ad impression to be credited. Given the ubiquity and popularity of video advertisements, advertisers may impose more sophisticated impression criteria that take into account factors such as time of day, device type, current usage or traffic levels, and so on. Additionally, advertisers may make tradeoffs between ad size and duration based on intrinsic differences between mobile, non-mobile, and other types of platforms.

In one embodiment, advertisements are placed by identifying and exploiting individual opportunities wherein the requirements for counting an impression are likely to be satisfied. A digital magazine may include an ad placement engine that is configured to identify and exploit such opportunities. Identification of opportunities may involve the observation and recordation of various parameters describing user behavior. Some examples include the speed at which a user browses through the magazine, categories or types of content which are of particular interest to a particular user, and so on. The ad placement engine may perform one or more computations using the collected user behavior information to determine likely opportunities. The ad placement engine may also access a stored user history profile that contains historical information describing the user, such as his/her browsing habits and content preferences. It should also be noted that these and other parameters may influence each other. For example, the user's browsing rate (or "flip rate") could vary based on the content category or publisher, the viewing mode currently in use, the time of day the user is viewing the magazine, or the type of device on which the magazine is being viewed (laptop or mobile).

As described previously, these opportunities represent instances in which an ad is likely to satisfy impression criteria if it were to be displayed. In most embodiments, an administrator or developer of the placement engine may determine a minimum threshold for the likelihood of satisfaction. If, for a particular instance or point in time, the likelihood of satisfying the impression criteria is determined to exceed the threshold, the placement engine designates an opportunity and serves an advertisement.

In practice, the ad placement engine can employ a variety of quantitative methods in order to identify opportunities. In simple embodiments, the ad placement engine may simply observe the average rate at which the user is flipping through the digital magazine. If the observed average rate demonstrates that the user spends long enough on each page (on average) to accommodate a minimum display duration for an ad image (or any other predetermined threshold), the ad placement engine can identify each new page flip as an opportunity. Subsequently, the ad placement engine can serve an ad to the user on each new page.

In another embodiment, the ad placement engine may monitor the browsing habits of a user for each of multiple content categories. The ad placement engine may recognize, for example, that the user spends more time on content of one kind and less time on content of another kind. Based on this observation, the ad placement engine may then identify one or more topics of interest to the user. The ad placement engine may then determine opportunities for ad placement on content pages that are associated with these topics of interest.

Figure 2:
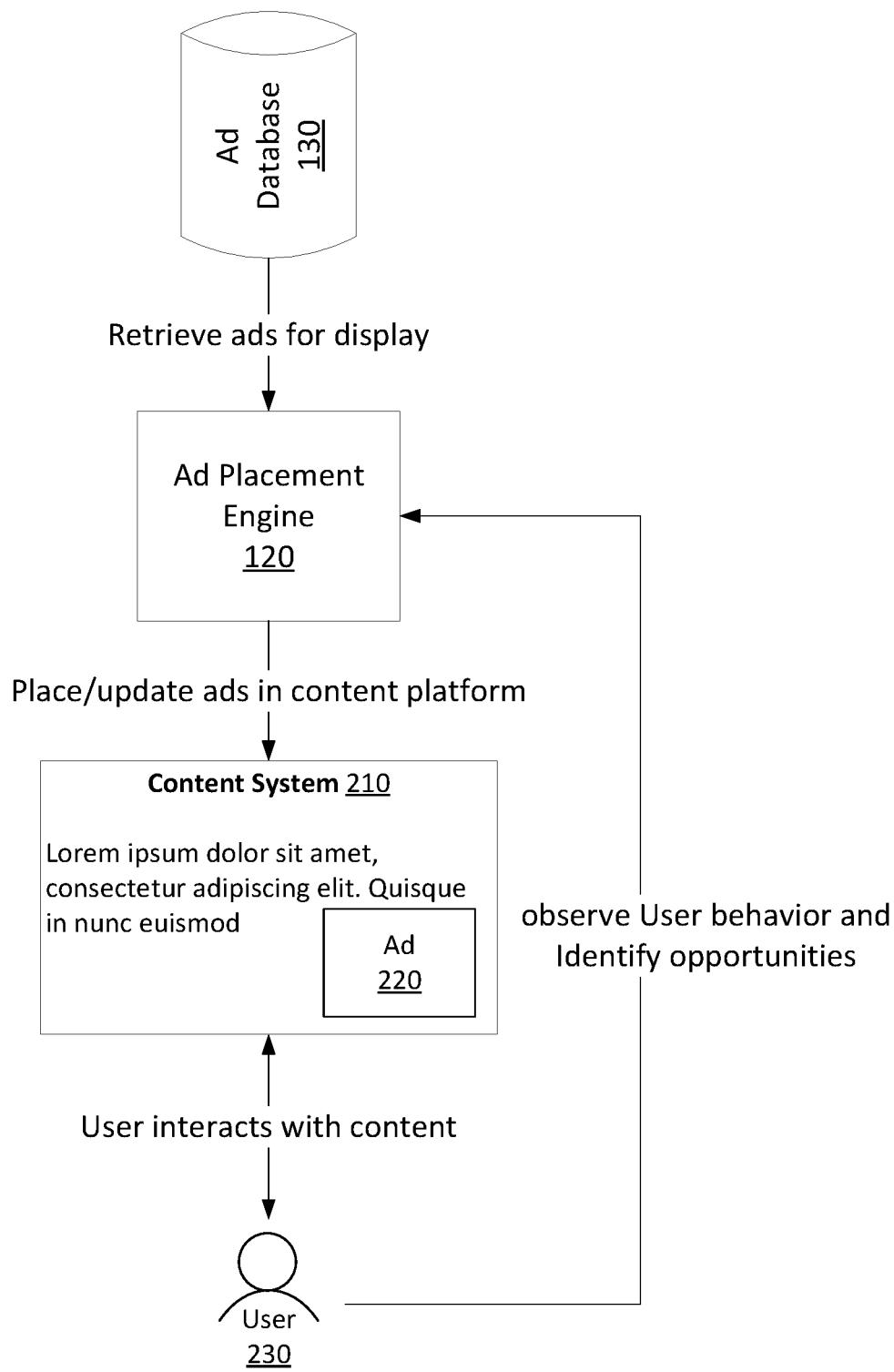
FIG. 2 illustrates a process of identifying opportunities and providing ads in a digital content system, according to one embodiment.

FIG. 2 illustrates a process of identifying opportunities and providing ads in a digital magazine, according to one embodiment. The environment 200 comprises the ad database 130 and ad placement engine 120 of FIG. 1, as well as a content system 210 and a user 230. The User 230 interacts with content displayed in the content system 210. During a period of interaction, the ad placement engine 120 observes user behavior and identifies one or more opportunities. For each identified opportunity, the ad placement engine 120 retrieves an ad from the ad database 130. The ad placement engine 120 places the ad in the content system 210 for viewing by the user 230.

The approach described above may also be implemented as part of a pre-bid process. In one embodiment, competing advertisers participate in a competitive bidding process in order to secure one or more placement opportunities offered by a digital magazine. Prior to engaging in the competitive bidding process, each advertiser may identify opportunities and determine for each opportunity a likelihood that an ad impression will be credited. The determined likelihood may then be used to guide the advertiser's purchasing strategy.

Verifying Successful Ad Impressions

In one embodiment, advertisers or administrators of the digital magazine may verify a successful ad impression subsequent to displaying or rendering an advertisement. In this situation, an advertisement may be displayed in a digital magazine without first determining the likelihood of satisfying relevant impression criteria. Then, subsequent to display of the ad, the ad placement engine 120, or a similar component associated with the content system 210 may determine whether display of the advertisement resulted in a successful ad impression. In one simple embodiment, the ad placement engine 120 may simply determine the success of the advertisement based on its total in-view time. In a more sophisticated embodiment, the ad placement engine 120 may analyze other factors, such as the percentage of the display space covered by the advertisement.

Content-Relevant Ad Placement

In more sophisticated embodiments, ads may be served that are related or relevant to the content being viewed by the user. This may help to minimize the distraction posed by ads, as well as to increase user engagement with ads. For example, users viewing content related to road cycling might be more likely to engage with ads relating to road cycling or bicycle equipment and accessories than ads that are completely unrelated. Content-relevant ads may additionally encourage users to spend more time viewing a content page, thereby increasing the likelihood that the display time for the ad is long enough to produce a successful impression.

The ad placement engine may implement content-relevant ad placement by dynamically monitoring the content being viewed by a user. At any given point in time, the ad placement engine may access one or more categories or content type identifiers associated with the currently displayed content and retrieve relevant ads to display within or alongside the content. The placement engine may then identify opportunities according to previously described techniques and serve one or more of these content-relevant ads. The placement engine may also iteratively improve the relevance of content-relevant ads by monitoring the reaction of users to the content-relevant ads. For example, the placement engine may record and analyze user mouseover events in order to determine which ad categories generate user interest. The placement engine could then serve more ads relevant to this category, thereby enhancing user engagement and increasing the likelihood that an ad impression is counted.

Flip-Based Navigation in a Digital Magazine

As described previously, a digital magazine presents digital content of an online content system in a magazine format to users. A digital magazine may execute as a client application (or client "app") running on a client device belonging to a user. Within the client app, the user browses through the digital magazine and can select articles, pictures, video, or other multimedia.

In the environment of a digital magazine as described above, content is organized into discrete content pages, similar to a paper magazine. Navigation from one content page to another is performed via a "flip" action. This typically involves the user swiping with a finger on the display screen of his or her client device. The flip is detected by the computing hardware of the client device, and in response a transition from one content page to another is initiated. The mechanics of page flips are described in detail in U.S. application Ser. No. 13/284,678 ("Systems and Methods for Flipping through Content"), which is incorporated by reference herein.

Figure 3:
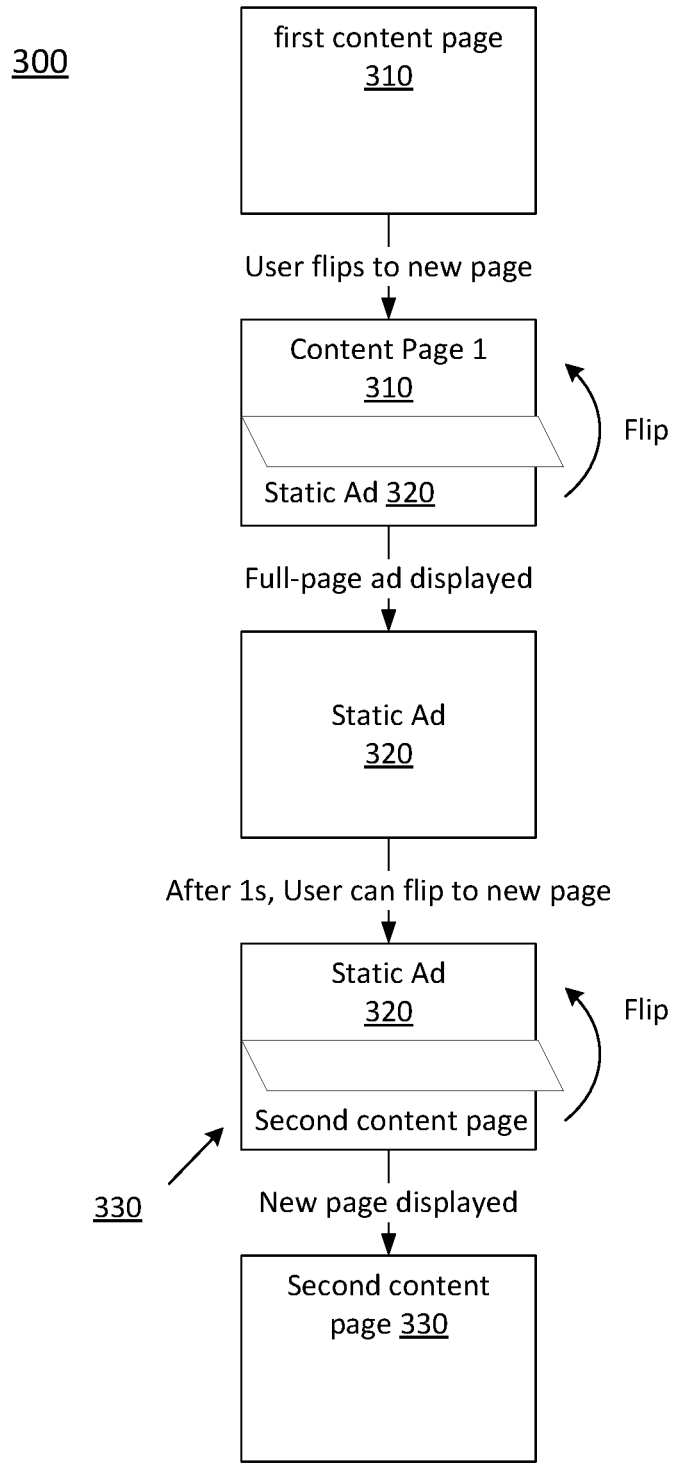
FIG. 3 illustrates a method for inserting a static advertisement between pages of a flip-based digital content system, according to one embodiment.

FIG. 3 illustrates a method for inserting a static advertisement between pages of a flip-based digital magazine, according to one embodiment. The environment 300 comprises a first content page 310, a static ad 320, and a second content page 330. A user viewing the first content page 310 on a screen of a client device may flip the page as described in previous embodiments to trigger display of the second content page 320. Responsive to this action, the content system inserts between the first content page 310 and second content page 330 the static ad 320, which occupies the entire screen area of the client device. The ad remains in the display screen of the client device for a predetermined duration. In one typical embodiment, the duration is one second. The duration may be purposefully selected so as to ensure that temporal aspects of the impression criteria are satisfied. During this time, the user cannot flip to the second content page 330 and the screen is effectively locked. Once the display duration is over, the user may flip to the second content page 330. In another embodiment, the transition from the static ad 320 to the second content page 330 may be performed automatically by the content system, and the user does not have to perform the flip action in order to effect the transition.

In an alternate embodiment, a dynamic ad may be displayed in place of static ad 320. This dynamic ad may be configured to perform one or more actions. For example, if the dynamic ad is advertising a tangible object, a 3-D rotatable view of the object may be displayed. The user could rotate and manipulate the object using one or more fingers. In another embodiment, the dynamic ad could feature multiple panes, with only one pane visible to the user at any given point in time. The panes could describe information such as price, discounts, availability, and so on. The user may, by swiping his or her finger, switch between the multiple panes of the advertisement.

Figure 4:
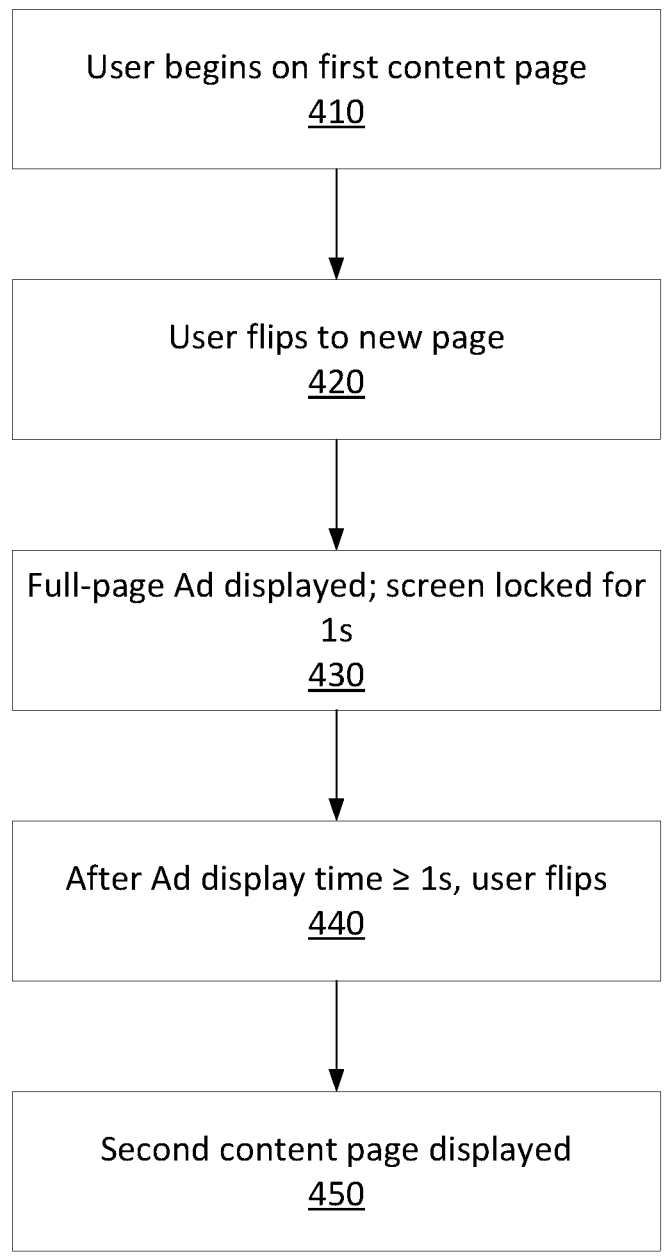
FIG. 4 is a flowchart illustrating a method for inserting a static advertisement between pages in a flip-based digital content system, according to one embodiment.

FIG. 4 is a flowchart illustrating a method for inserting a static advertisement between pages in a flip-based digital magazine, according to one embodiment. A user begins 410 on the first content page. After the user is finished viewing the content on the first content page, the user flips 420 to a new content page. Responsive to the flip action, the system displays 430 a full-page ad, and locks the screen to further user input. Once the display duration of the ad is satisfied, the user flips 440 again. The second content is displayed 450. As described previously, in another embodiment the transition from the full-page static ad to the second content page may be performed automatically, without the use having to perform the flip action.

Persisting an Advertisement Across Consecutive Pages

In another embodiment, ads are persisted from one page to another in the digital magazine to satisfy the display duration requirement associated with the ad. This technique may be used, for example, when the ad is embedded into an article and only occupies a portion of the screen area of the client device, as opposed to occupying the entire screen area. So-called embedded ads may be less intrusive than the full-page ads described in previous embodiments, which delay the transition from content page to another.

Specifically, embedded ads are persisted across consecutive pages of the digital magazine when a particular user is flipping through the digital magazine at a rapid rate, resulting in limited viewing time for each individual content page. Ads can be persisted to ensure that the ad is visible to the user for at least the required amount of time, regardless of how quickly the user is flipping through the pages. Ad persistence to ensure sufficient display duration is also known as forced satisfaction.

Figure 5A:
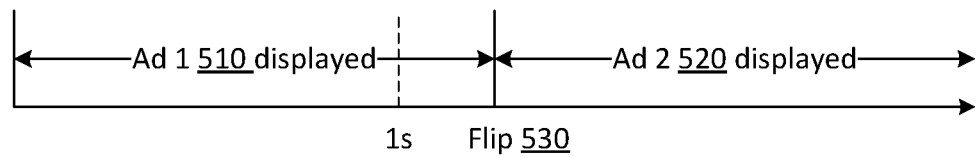
FIG. 5a is a timeline illustrating one instance of unforced satisfaction of temporal requirements, according to one embodiment.
Figure 5B:
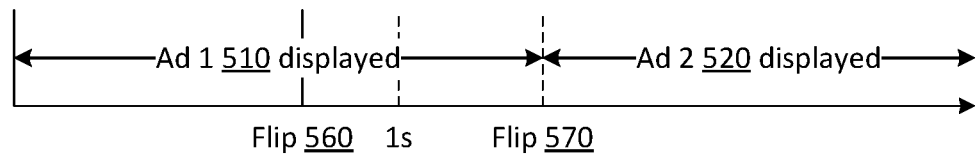
FIG. 5b is a timeline illustrating one instance of forced satisfaction of temporal requirements, according to one embodiment.

FIGS. 5a and 5b illustrate the difference between forced and unforced satisfaction of display duration requirements. FIG. 5a is a timeline illustrating one instance of unforced satisfaction of display duration requirements, according to one embodiment. The environment 500 comprises two ads, Ad 1 510 and Ad 2 520 respectively, and a flip action 530. As described in previous embodiments, the flip 530 represents a user action that causes a new content page to be displayed. Ad 1 510 is displayed on a content page of the digital system at a time represented by the leftmost edge of the timeline. After one second has passed, the user still has not flipped to a new content page. When the user does perform the flip action 530, the display duration requirements of Ad 1 510 are satisfied and the new Ad 2 520 is displayed.

FIG. 5b is a timeline illustrating one instance of forced satisfaction of a display duration requirement, according to one embodiment. The environment 550 comprises the two ads Ad 1 510 and Ad 2 520 described in FIG. 5a, as well as two flip actions 560 and 570 respectively. Ad 1 510 is displayed on a content page of the digital system at a time represented by the leftmost edge of the timeline. Before one second has passed, the user performs a flip action 560, causing a second content page to be displayed. Because the display duration requirement for Ad 1 510 have not yet been satisfied, Ad 1 510 is persisted into the second content page. While the user is browsing the second content page, the display duration of Ad 1 510 reaches one second and the requirement is therefore satisfied. When the user performs the next flip action 570, a new content page is displayed, this time with the new Ad 2 520.

Figure 6:
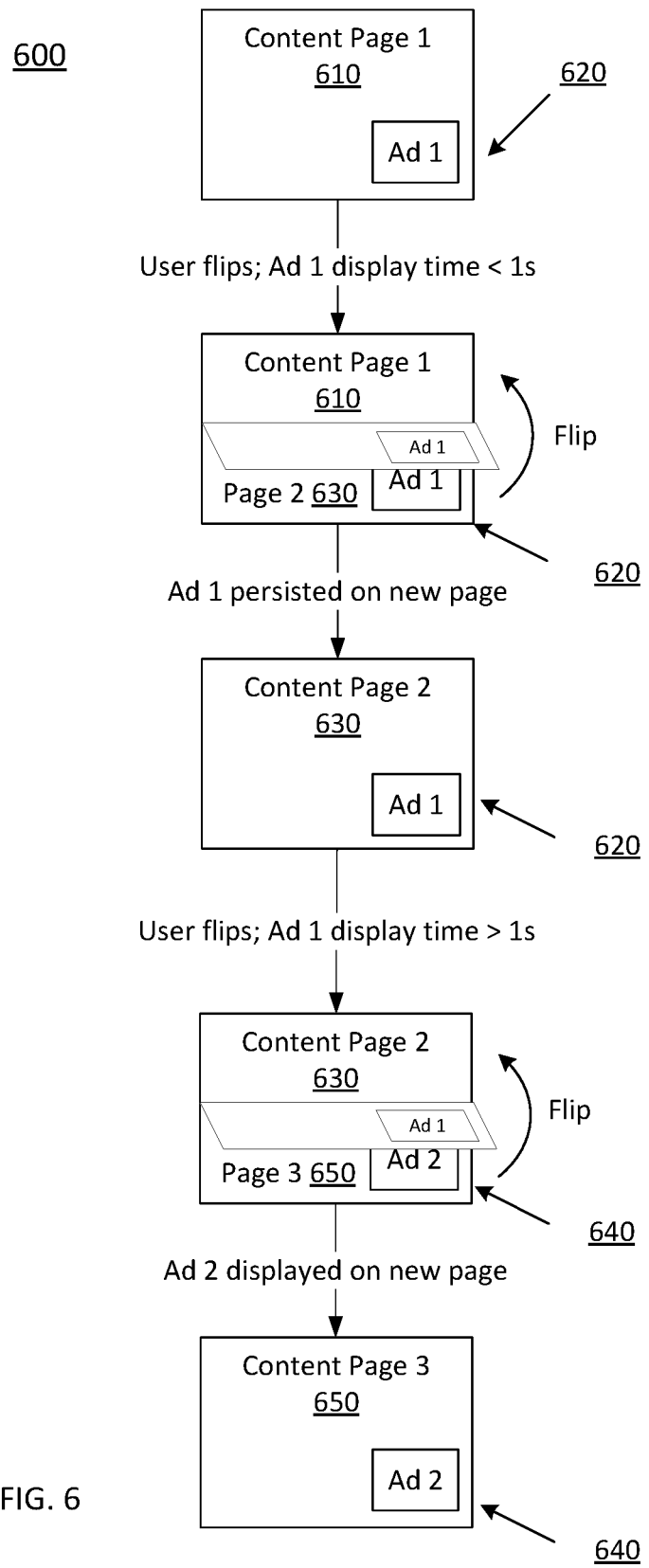
FIG. 6 illustrates a method for persisting an advertisement across consecutive pages in a flip-based digital content system, according to one embodiment.

FIG. 6 illustrates a method for persisting an advertisement across consecutive pages in a flip-based digital magazine, according to the embodiment described in FIG. 5b. The environment 600 comprises a Content Page 1 610, an Ad 1 620, a Content Page 2 630, an Ad 2 640, and a Content Page 3 650. A user begins by browsing the content displayed on Content Page 1 610. Ad 1 620 is displayed on Content Page 1 610, and occupies a portion of the total screen area of the client device. If the user flips to Content Page 2 630 before the display duration requirement for Ad 1 620 is satisfied, then Ad 1 620 is persisted in Content Page 2 630. While the user browses the content displayed on Content Page 2 630, the display duration requirement for Ad 1 620 may be satisfied. If the user then flips to Content Page 3 650, then Ad 1 620 is no longer persisted. Content Page 3 650 is therefore displayed with a new Ad 2 640.

Figure 7:
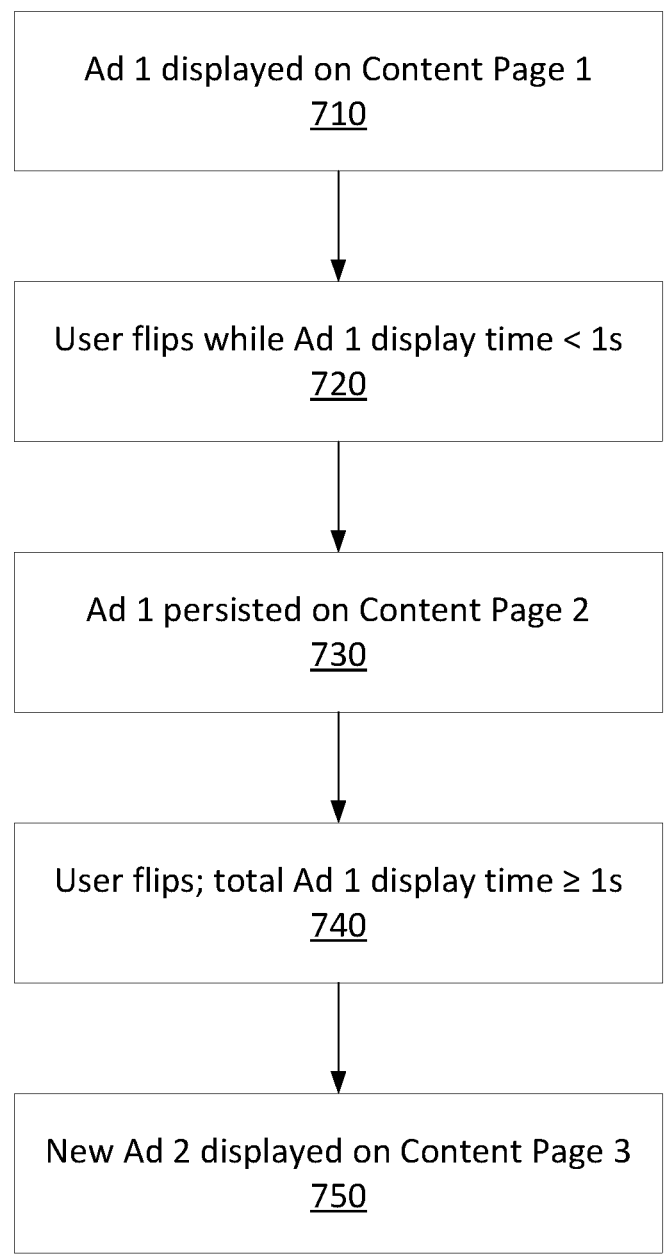
FIG. 7 is a flowchart illustrating a method for persisting an advertisement across consecutive pages in a flip-based digital content system, according to one embodiment.

FIG. 7 is a flowchart illustrating a method for persisting an advertisement across consecutive pages in a flip-based digital content system, according to the embodiment illustrated in FIG. 6. The user begins with an Ad 1 displayed 710 on Content Page 1. The user then flips 720 while Ad 1 has been displayed for less than one second. Ad 1 is therefore persisted 730 on Content Page 2. After browsing Content Page 2, the user flips again 740, but now the total display time for Ad 1 is equal to or greater than one second. Thus, a new Ad 2 is displayed 750 on Content Page 3.

Other Applications in Page-Flip Environments

The previously described techniques for ensuring viewability of advertisements can be extended to other environments not related to advertising. For example, students increasingly use digital textbooks to consume educational content. Traditional paper textbooks present content in a static form, which usually consists of images embedded between paragraphs of text. An advantage of digital textbooks is that they can be enhanced to present multimedia content, such as interactive images, diagrams, and videos. In one example embodiment, a digital anatomy textbook could persist a particular anatomical diagram across multiple pages, so that a reader could easily refer to the diagram as he/she reads the corresponding text. This would save the user the inconvenience of having to flip backward and forward through the digital textbook to identify relationships between the diagram and the text.

In a more advanced embodiment, software included with the digital textbook could monitor the user's navigation through the digital textbook. The software could observe and record various parameters describing the user's navigation, including the rate at which the user progresses through the various sections or chapters of the textbook, or the sections or chapters which seem to be of greatest interest to the user. Based on this, the software could identify areas or topics on which the user is focusing extra attention, either due to interest or due to difficulty. The textbook could then place supplementary content into the textbook in one of multiple ways (as described previously). This content could potentially enhance the topic of interest, helping the user to better understand the content or learn more from it.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing ads in a digital system based on user behavior, the method comprising:

receiving by the digital system information describing behavior of a user in an online environment of a digital magazine application executed by a client device and including discrete pages that each include content from the digital system presented by the client device and where the user navigates between discrete pages by performing a flip action through the digital magazine application executed by the client device, the information describing behavior of the user in the environment of the digital magazine including an amount of time the user views different pages of content in the digital magazine, a type of the client device on which the digital magazine from the digital system is presented, and amounts of time spent by the user accessing different categories of content included in the digital magazine from the digital system;

recording the received information describing behavior of the user in the environment of the digital magazine by the digital system;

accessing, by the digital system, the recorded information describing behavior of the user in the environment of the digital magazine recorded at the digital system;

identifying, by the digital system, one or more criteria describing behavior of the user in the online environment of the digital magazine application;

identifying, by the digital system, an opportunity to present one or more advertisements to the user at a location within a page of the digital magazine based on the identified one or more criteria describing behavior of the user in the online environment of the digital magazine application and the type of the client device indicating display of an advertisement at the location within the page of the digital magazine satisfying one or more temporal and spatial requirements for the advertisement to be visible to the user;

in response to identifying the opportunity, selecting, by the digital system, the advertisement for display by the client device at the identified opportunity; and transmitting the advertisement by the digital system to the client device for presentation via the identified opportunity by the digital magazine application in the location within the page of the digital magazine corresponding to the identified opportunity.

2. The method of claim 1, wherein the identifying an opportunity to present one or more advertisements to the user at a location within a page of the digital magazine based on the identified one or more criteria describing behavior of the user in the online environment of the digital magazine application and the type of the client device indicating display of the advertisement at the location within the page of the digital magazine satisfying one or more temporal and spatial requirements for the advertisement to be visible to the user comprises:

determining display of the advertisement at the location within the page of the digital magazine satisfies one or more temporal and spatial requirements for the advertisement to be visible to the user based on at least one of: dynamic monitoring of a user's interaction with the digital system, and analysis of historical data describing the user's previous interactions with the digital system.

3. A non-transitory computer readable storage medium storing instructions for providing ads in a digital system based on user behavior, the instructions when executed by a processor configured to cause the processor to:

receive, by the digital system, information describing behavior of a user in an online environment of a digital magazine application executed by a client device and including discrete pages that each include content from the digital system presented by the client device and where the user navigates between discrete pages by performing a flip action through the digital magazine application executed by the client device, the information describing behavior of the user in the environment of the digital magazine including an amount of time the user views different pages of content in the digital magazine, a type of the client device on which the digital magazine from the digital system is presented, and amounts of time spent by the user accessing different categories of content included in the digital magazine from the digital system;

record the received information behavior of the user in the environment of the digital magazine the digital system;

access, by the digital system, the recorded information describing behavior of the user in the environment of the digital magazine recorded at the digital system;

identify, by the digital system, one or more criteria describing behavior of the user in the online environment of the digital magazine application;

identify, by the digital system, an opportunity to present one or more advertisements to the user at a location within a page of the digital magazine based on the identified one or more criteria describing behavior of the user in the online environment of the digital magazine application and the type of the client device indicating display of an advertisement at the location within the page of the digital magazine satisfying one or more temporal and spatial requirements for the advertisement to be visible to the user;

in response to identifying the opportunity, selecting, by the digital system, the advertisement for display by the client device at the identified opportunity;

and transmit the advertisement by the digital system to the client device for presentation via the identified opportunity by the digital magazine application in the location within the page of the digital magazine corresponding to the identified opportunity.

4. The non-transitory computer readable storage medium of claim 3, wherein the identify an opportunity to present one or more advertisements to the user at a location within a page of the digital magazine based on the identified one or more criteria describing behavior of the user in the online environment of the digital magazine application and the type of the client device indicating display of the advertisement at the location within the page of the digital magazine satisfying one or more temporal and spatial requirements for the advertisement to be visible to the user comprises:

determine display of the advertisement at the location within the page of the digital magazine satisfying one or more temporal and spatial requirements for the advertisement to be visible to the user based on at least one of: dynamic monitoring of a user's interaction with the digital system, and analysis of historical data describing the user's previous interactions with the digital system.

* * * * *

UNITED STATES PATENT AND TRADEMARK OFFICE
CERTIFICATE OF CORRECTION

PATENT NO. : 10,600,071 B2  
APPLICATION NO. : 14/958742  
DATED : March 24, 2020  
INVENTOR(S) : Wigder Page 1 of 1

It is certified that error appears in the above-identified patent and that said Letters Patent is hereby corrected as shown below:

In the Claims

In Column 10, Claim 3, Line 20, delete "magazine the digital" and insert --magazine by the digital--, therefor.

Signed and Sealed this  
Nineteenth Day of April, 2022

Katherine Kelly Vidal  
*Director of the United States Patent and Trademark Office*